Patented Apr. 12, 1949

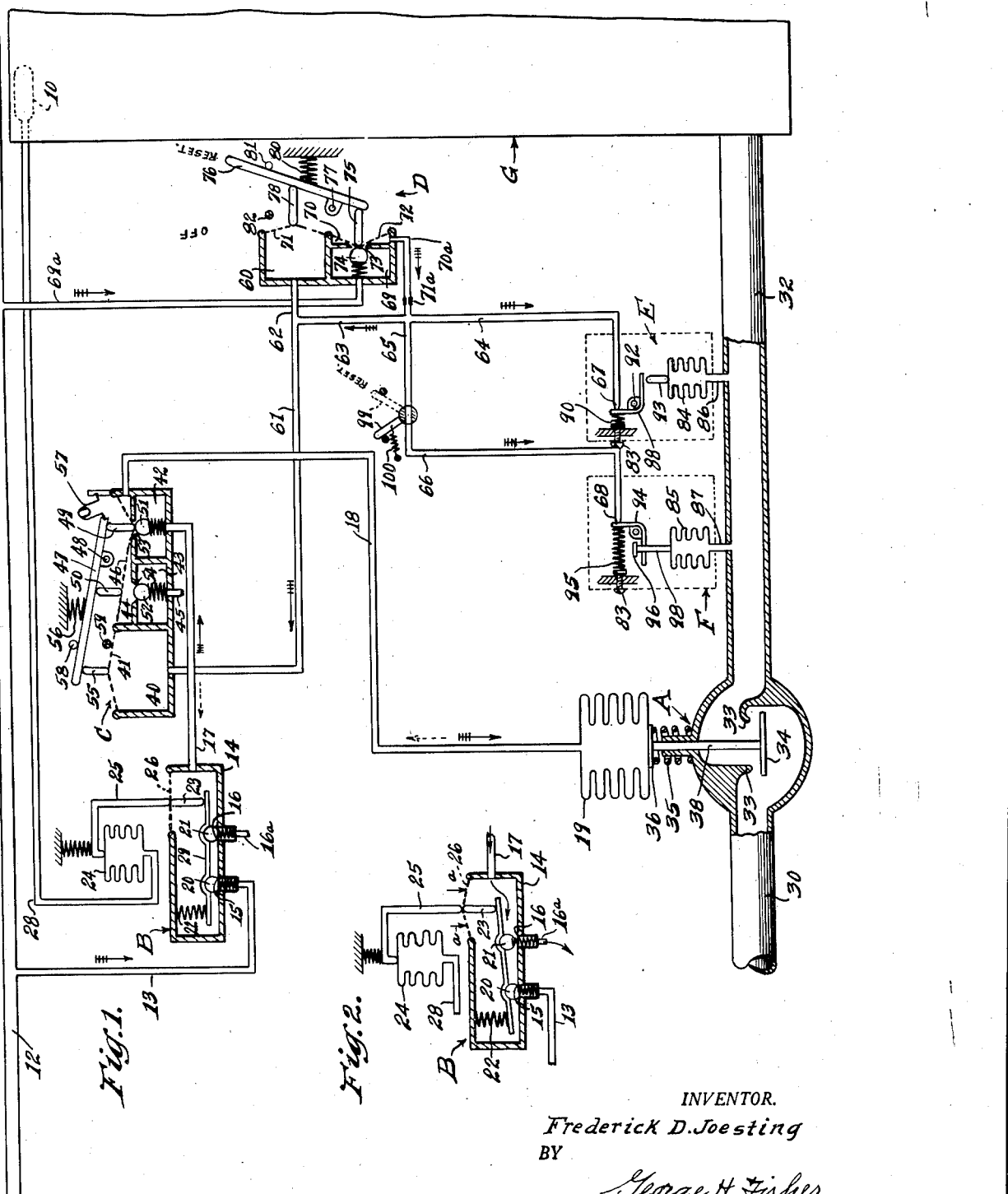

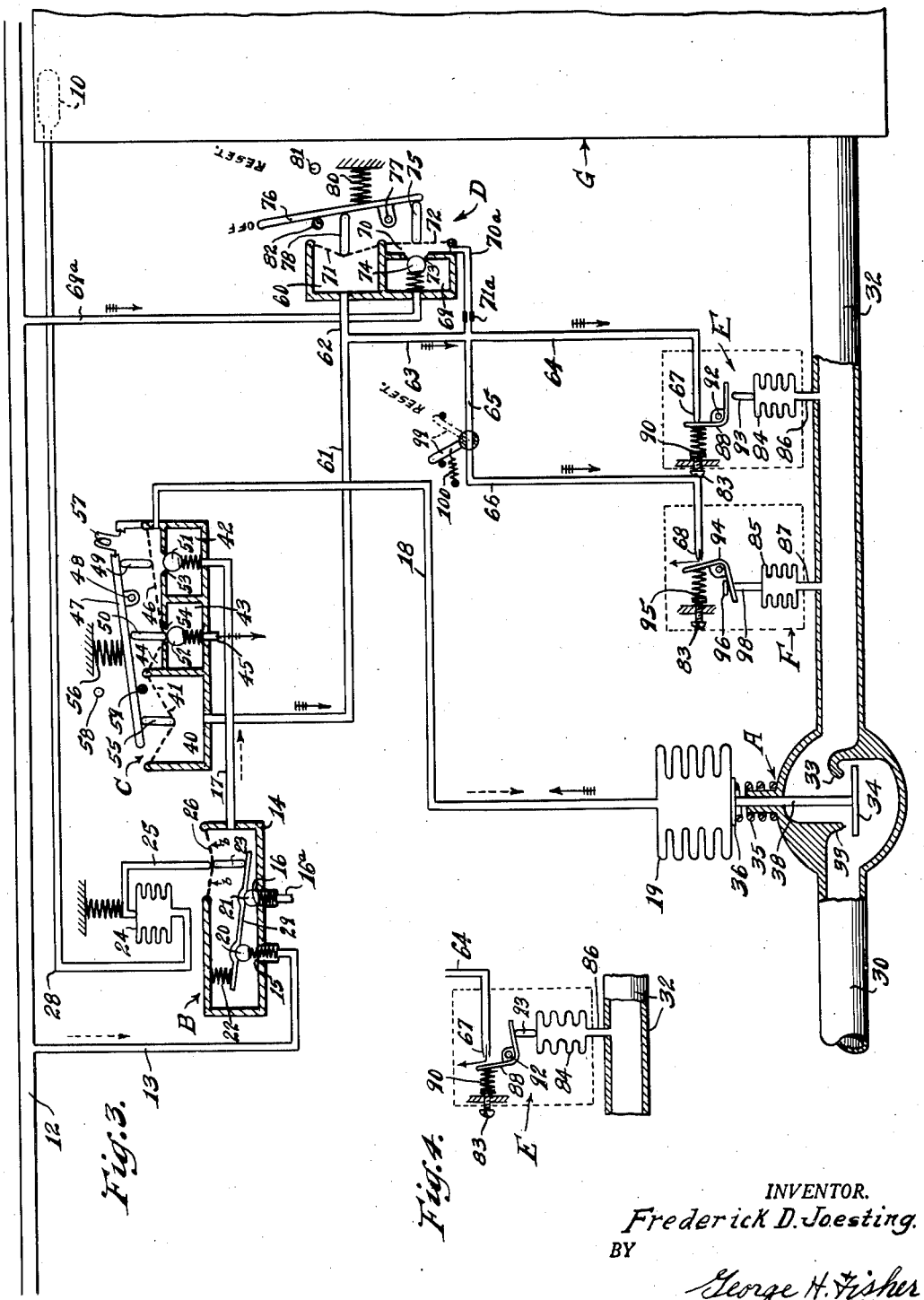

2,467,357

UNITED STATES PATENT OFFICE 2,467,357

PNEUMATIC LOCKOUT CIRCUIT

Frederick D. Joesting, Oak Park, Ill., assignor to Minneapolis-Honeywell Regulator Company, Minneapolis, Minn., a corporation of Delaware Application January 25, 1946, Serial No. 643,323

18 Claims. (Cl. 236—1)

My present invention relates to a pneumatic control circuit for controlling a valve or the like in such manner that the position of the valve is primarily controlled in response to a condition that is changed by reason of operation of the valve, and secondarily by a condition on the outlet side of the valve reaching either a low limit or a high limit and thereby shutting down the control system entirely until such time as the system is placed in operation again manually.

One object of the invention is to provide a pneumatic relay arrangement which functions to shut down a system controlled by a pneumatic graduating thermostat or the like in the event that pressure in the line from a control valve controlled by the thermostat reaches a predetermined limit, one pneumatic relay being thereupon operable to an "off" position where it remains until it is manually reset for reconditioning the pneumatic circuit for automatic operation.

Another object is to provide a pneumatic circuit which is comparatively simple for accomplishing closure of a steam supply valve or the like upon a limit condition being reached.

Still another object is to provide a pneumatic circuit including a pneumatic relay between a graduating controller and a graduate acting control valve, which relay in turn is controlled by a second relay and a pressure controller for throttling action which bleeds the first relay and thereby causes it to cut off the supply of air from the graduating thermostat to the graduate acting control valve, the pressure controller being either a high limit type or a low limit type, or the installation being provided with both types if protection is desired for both high and low limits of pressure from the control valve.

Still a further object is to provide a pneumatic relay that normally opens the pneumatic circuit between a thermostat and a control valve due to pressure in a pressure chamber of the pneumatic relay, one or two pressure controllers being provided for bleeding the pressure chamber of the pneumatic relay at either a predetermined high limit, or a predetermined low limit, or both, and the supply of air to the pressure controllers being cut off by means of a second pneumatic relay having a pressure chamber also responsive to the throttling action produced by the pressure controllers.

With these and other objects in view, my invention consists in the construction, arrangement and combination of the various parts of my circuit whereby the objects contemplated are attained, as hereinafter more fully set forth, pointed out in my claims and illustrated in the accompanying drawings, wherein:

Fig. 1 is a diagrammatic view of a pneumatic lockout circuit embodying my invention and showing the circuit in normal operation.

Fig. 2 is a diagrammatic view of a thermostat thereof in a pressure reducing position Fig. 3 is a diagrammatic view similar to Fig. 1 showing the position of the parts upon occurrence of a high limit pressure being reached, the thermostat of Fig. 3 being shown in a pressure increasing position as compared to the neutral position of Fig. 1 and the pressure decreasing position of Fig. 2, and other elements of the circuit also being shown in different positions than in Fig. 1.

Fig. 4 is a diagrammatic view of a high limit pressure control of Fig. 1 showing it in the high limit position.

On the accompanying drawings I have used the reference character A to indicate in general a control valve of the pneumatic operated graduate acting type, and B a controller therefor of the graduating non-bleeding type of pneumatic thermostat, and provided with a remote control bulb 10.

In the usual type of pneumatic control circuit where the controller B controls the valve A without any of the additional controls of my present invention, a supply line or "main" 12 is provided for supplying compressed air to the elements A and B. The supply main for the controller B is shown at 13.

The controller B consists essentially of a housing 14 having an inlet valve seat 15 and an exhaust valve seat 16 connected to atmosphere at 16a. A branch pipe 17 is connected with the housing 14 and normally connects directly to the valve A, whereas in my system it serves as a main for a positive pneumatic relay C from which a branch line 18 extends to a pressure connection of the valve A so as to feed into a pneumatic motor 19.

The pneumatic thermostat B further includes a main valve 20 such as one of the ball type, and an exhaust valve 21, both of which when free will be unseated by springs below them. They are normally retained seated, however, by a main spring 22 and a mechanical connection or thrust pin 23 which is operatively connected with a pressure sensitive bellows 24 as by a second thrust pin 25. The pins 23 and 25 are on opposite sides of a flexible diaphragm 26.

A capillary tube 28 is connected with the bellows 24 and terminates in the bulb 10, and the capillary tube and bulb are charged with a suitable liquid so that expansion or vaporization of the liquid in the bulb 10 expands the bellows 24 and thereby mechanically transmits motion to a rock lever 29 in the controller B.

The control valve A has an intake connected with a steam pipe or the like 30, and an outlet pipe 32 extending to a device that utilizes the steam such as an enclosure G. Steam has been used by way of illustration, whereas if the device G requires cooling, a cooling medium would be controlled by the valve A. The valve in that case would be direct acting instead of reverse acting as illustrated, in order to work properly in relation to the thermostat B.

Again, the controller B might be responsive to humidity instead of temperature with the valve A controlling the flow of water or other humidifying medium. The controller B therefore is, in effect, a condition-responsive controller responding to whatever condition is produced or changed by the medium that is controlled by the valve A and my lockout circuit as here described would be applicable to any of these different types of installations.

Returning to the valve A, it consists of a valve seat 33 against which a valve disc 34 is normally seated by a spring 35. The spring 35 bears against a head 36 on the stem 38 of the valve and normally collapses the bellows 19. With such an arrangement any expansion of the bellows as caused by compressed air supplied thereto, will open the valve 34 against the action of the spring 35 and the degree of opening will be determined by the amount of air fed to the bellows 19.

The positive pneumatic relay C has a pressure chamber 40 closed by a flexible diaphragm 41 and has three valve chambers 42, 43 and 44. The valve chamber 42 is connected to the branch pipe 17 from the controller B, and the chamber 44 is connected by the branch pipe 18 to the bellows 19. The valve chamber 43 is open to atmosphere as at 45, and the chamber 44 is closed by a diaphragm 46.

A rock lever 47 is pivoted at 48, and has actuating pins 49 and 50 contacting with the diaphragm 46, and through it with an inlet valve 51 and an exhaust valve 52 of the valve chambers 42, 43 and 44. These valves are normally spring-seated against their respective seats 53 and 54. Automatic actuation is provided for the lever 47, by a pin 55 which is operated by the diaghragm 41 against the bias of a spring 56.

The pneumatic relay C is of the "positive type," that is, it is either at one limit of movement or at the other, and this is effected by an overcenter toggle spring 57. The limits of movement of the lever 47 are determined by stationary stops 58 and 59.

My lockout circuit further includes a second pneumatic relay D which need not be of the positive type, and pressure controls E and F where the installation calls for pressure limits. On other types of installations the controls E and F may respond to conditions other than pressure such as response to moisture limits in a humidity controlling installation, etc. The controls E and F are preferably adjustable as by means of adjusting screws 83 for setting the upper and lower condition limits as desired. The pneumatic relay D is somewhat similar to the pneumatic relay C, but requires only one valve and no exhaust to atmosphere. It has a pressure chamber 60 connected by pipes 61 and 62 to the pressure chamber 40, and by pipes 63, 64, 65 and 66 to nozzle ports 67 and 68 of the pressure controls E and F.

The pneumatic relay D has valve chambers 69 and 70. The chambers 60 and 70 of the relay D are closed by diaphragms 71 and 72 respectively. Between the chambers 69 and 70 is a valve seat 73 on which a valve 74 is normally spring-seated. This valve may be unseated as in Fig. 1 by a thrust pin 75 coacting with a rock lever 76 pivoted at 77. The rock lever is actuated from the diaphragm 71 by a thrust pin 78 in opposition to a spring 80. Stops 81 and 82 are provided for the lever 76.

The pressure control E is a reverse acting type designed to respond to a predetermined upper limit of pressure in the pipe 32. The pressure control F is a direct acting type designed to respond to a predetermined low limit of pressure in the pipe 32. For the purpose of responding to pressure, the controllers E and F have pressure bellows 84 and 85 respectively connected as by pipes 86 and 87 to the pipe 32. They of course may have, substituted for the bellows, elements which are responsive to other conditions.

The bellows 84 of the pressure controller E is adapted to unseat a flapper blade 88 from the nozzle port 67 against the action of a spring 90, the blade being pivoted at 92 and engaged by a thrust pin 93 for this purpose when the bellows 84 expands to its predetermined upper limit setting as in Fig. 3.

A flapper blade 94 is provided for the nozzle port 68 of the pressure controller E, and is normally seated against the nozzle by a spring 95. The blade is adapted to be unseated by collapse of the bellows 85 to a predetermined position where the head 96 of the stem 98 engages the flapper blade 94 and moves it to the position of Fig. 4.

The lever 76 of the pneumatic relay D is adapted for manually resetting, and has respective positions indicated as "off" and "reset." A resetting valve 99 is also provided, the purpose of which will be hereinafter explained. It is normally held in the open position by a spring 100.

Practical operation

In the operation of my pneumatic lockout circuit, assuming that the valve A is in the position shown in Fig. 1 and the thermostat B is satisfied, both of its valves 20 and 21 will be closed. Feathered arrows indicate the direction of flow of air after initiation of the circuit, and before the valve 20 is closed due to the thermostat being satisfied. The feathering on the arrows indicates that the air flow has stopped and the air in all piping is static.

If there is an increase in temperature, the valve 21 will open as in Fig. 2, due to expansion of the fill in the bulb 10 acting on the bellows 24 to expand it. This will permit flow of air out of the bellows 19 of the control valve A through the pipe 18, the chamber 44 of the pneumatic relay C, its valve seat 53, past the valve 51 into the chamber 42, and from there through the pipe 17 into the housing 14 and out past the valve 21, and through the exhaust port 16 to atmosphere as indicated by dotted arrows in Fig. 1 and full line arrows in Fig. 2.

The reduction of pressure under the diaphragm 26 will permit atmospheric pressure to act on the top of the diaphragm as indicated by the arrows a in Fig. 2, and this will reclose the valve 21 when the atmospheric pressure and the pressure in the bellows 24 are in balance. This may permit only a small closing movement of the valve A, and, therefore, only a slight reduction in the flow of steam into the device G, thus providing a graduate control for the steam in proportion to the temperature desired in the vicinity of the bulb 10.

On the other hand, if there is a drop in temperature, the bellows 24 will collapse somewhat as in Fig. 3, permitting the valve 20 to open, and more air will flow as indicated by the dotted arrows in this figure into the bellows 19 for spacing the valve disc 34 farther from its seat 33. (The relay C is at this time in the position of Fig. 1 for normal operation and not the position of Fig. 3.) The increase in pressure under the diaphragm 26 as indicated by the arrows $b$ will cause a balance to be reached between the pressure in the housing 14 and the bellows 24 to reclose the valve 20 when the valve A reaches the proper position for keeping the bulb 10 at the desired temperature.

As long as the pressure of the steam delivered to the pipe 32 is no higher than the setting of the pressure control E, or no lower than the setting of the pressure control F, the valve A will be controlled in a graduate fashion in accordance with temperature at the bulb 10 actuating the thermostat B.

The chamber 69 of the relay D being supplied with pressure from the main line 12 through a pipe 69a is at main line pressure, and the valve 74 being normally open will result in a supply of air from the chamber 70 through a branch pipe 70a to the pipes 61 to 66, inclusive. This supply is through a restriction port 71a for a purpose which will hereinafter appear. The air in the pipes 64 and 65 is blocked off from atmosphere at the nozzle ports 67 and 68, whereas, the air in the pipe 63 flows into the pressure chamber 40 of the pneumatic relay C for normally keeping the rock lever 47 in the position of Fig. 1 so that the valve 51 remains open.

*Lockout operation due to lower limit pressure being reached*

When the pressure in the pipe 32 drops below a predetermined limit as set by the pressure control F, its bellows 85 will collapse to such a point that the thrust pin 98 rocks the flapper blade 94 to the position shown in Fig. 3, and the nozzle port 68 then acts as a bleeder for the pipes 66, 65, 63, 62 and 61 on the down stream side of the restriction port 71a, as the area of the port 68 is larger than that of the port 71a. This is indicated by feathered arrows and effects a reduction of the pressure in the chambers 40 and 60 of the pneumatic relays C and D so that the springs 56 and 80 expand as in Fig. 3 for the purpose of closing the valve 51 and opening the valve 52, and closing the valve 74. With the valve 51 closed, air can no longer be supplied from the pipe 17 to the pipe 18, and thereby to the motor bellows 19 of the main valve A. With the valve 52 open, air in the bellows 19 will flow upwardly through the pipe 18 and into the chamber 44, then through the valve seat 54 past the valve 52 and will exhaust from the chamber 43 to atmosphere at 45 as also indicated by feathered arrows.

With the valve 74 closed, air can no longer be fed from the main line 12 to the branch 70a and the restriction port 71a. Accordingly the air released at the nozzle port 68 is not replaced and the pipe system 61 to 66 is reduced to atmospheric pressure through the port 68. The lever 76 is now in the "off" position and the entire pneumatic system is shut down and locked out so that it cannot be restarted except by a manual resetting operation.

The purpose of locking out the system is to enable the operator to determine the cause of excessively low pressure in the pipe 32, and remedy the cause, and then again place the system back into operation. To do this, he manually moves the lever 76 from the "off" position to the "reset" position and at the same time moves the valve 99 to "reset" position and holds it there until pressure has built up behind the diaphragms 41 and 71 to a point where the pneumatic relays will remain in their positions of Fig. 1. The valve 99 may then be released and the control valve A will return to control of the thermostat B as the valve 51 would be open at that time and permit communication between the pipes 17 and 18. The system will remain in the automatic operation until such time as another lockout occurs.

*Lockout operation due to upper limit pressure being reached*

The pressure control E on the other hand, opens the nozzle port 67 to atmosphere upon the occurrence of a predetermined high pressure, the parts of the control E then being in the position of Fig. 4. This operation likewise bleeds the pipe system leading to the pressure chambers 40 and 60, so that they assume their positions as illustrated in Fig. 3, and a manual reset is then required before the system can be put back in operation. This reset operation involves the lever 76 as explained in connection with reset after the pressure control F shuts down the system, but does not involve the valve 99 as the control E will reclose after the valve A closes.

The pressure in the chambers 40 and 50 need not be very great, for instance, on the order of three pounds, whereas, the pressure in the main line 12 may be as high as fifteen pounds. When the pressure is greater than three pounds, the relay D remains in the position of Fig. 1, whereas when it drops below three pounds due to opening of the nozzle port in either of the pressure controls E or F, it will move to "off" position, and close the valve 74.

While I have shown both a high limit control (E) and a low limit control (F), either one alone can be used in any desired installation. When the high limit control only is desired, the valve 99 need not be provided. Also the valve A may be direct or reverse acting as already mentioned and the controller B as well as the controls E and F may be responsive to temperature, or any other condition.

Thus many different types of installations may be accommodated by means of a lockout circuit of the kind I disclose, and I wish it to be understood that my claims are not to be limited to only the type of installation disclosed in the drawings and specification and should be construed broadly enough to cover such modified forms of structure or use of mechanical equivalents as may be reasonably included within their scope.

I claim as my invention:

1. In a pneumatic lockout circuit of the type having a graduating condition-responsive controller for controlling a graduate acting control valve, means to render the control of said condition-responsive controller on said control valve ineffective comprising a pneumatic relay, means to normally maintain a predetermined pressure in a pressure chamber thereof to render the control of said condition-responsive controller on said control effective, a second condition-responsive controller responding to a condition on the outlet side of said control valve for bleeding air from said pressure chamber of said pneumatic relay, and a lockout device comprising a second pneumatic relay having a pressure chamber also bled by said second condition-responsive controller and operable to thereupon close off the supply of air to said second condition-responsive controller and said pressure chambers.

2. In a pneumatic lockout circuit of the type having a graduating condition-responsive controller for controlling a graduate acting control valve, means to render the control of said condition-responsive controller on said control valve ineffective comprising a pneumatic relay, means to normally maintain a predetermined pressure in a pressure chamber thereof to render the control of said condition-responsive controller on said control valve effective, and means operable by a condition on the outlet side of said control valve for bleeding air from said pressure chamber to atmosphere upon an undesirable condition being attained on said outlet side of said control valve.

3. In a pneumatic lockout circuit of the type having a graduating condition-responsive controller for controlling a graduate acting control valve, means to cut off the supply of air from said condition-responsive controller to said control valve comprising a pneumatic relay, means to normally maintain a predetermined pressure in a pressure chamber thereof to provide communication between said condition-responsive controller and said control valve, means operable by a high limit condition on the outlet side of said control valve for bleeding air from said pneumatic relay to permit the same to close off communication between said condition-responsive controller and said control valve, and a lockout device comprising a second pneumatic relay also responsive to said predetermined pressure and operable upon reduction thereof to close off the supply of air to said pressure chamber.

4. In a pneumatic lockout circuit of the type having a graduating condition-responsive controller for controlling a graduate acting control valve, means to cut off the supply of air from said condition-responsive controller to said control valve comprising a pneumatic relay, means to normally maintain a predetermined pressure in a pressure chamber thereof to provide communication between said condition-responsive controller and said control valve, means operable by a low limit condition on the outlet side of said control valve for bleeding air from said pneumatic relay to permit the same to close off communication between said condition-responsive controller and said control valve, and a lockout device comprising a second pneumatic relay also responsive to said predetermined pressure and operable upon reduction thereof to close off the supply of air to said pressure chamber.

5. In a pneumatic lockout circuit of the type having a graduating condition-responsive controller for controlling a graduate acting control valve, means to render the control of said condition-responsive controller on said control valve ineffective comprising a pneumatic relay, means to normally maintain a predetermined pressure in a pressure chamber thereof to render the control of said condition-responsive controller on said control valve effective, means operable by either high or low pressure on the outlet side of said control valve for bleeding air from said pneumatic relay to permit the same to assume a position rendering the control of said condition-responsive controller on said control valve ineffective, and a lockout device comprising a second pneumatic relay also responsive to said predetermined pressure and operable upon reduction thereof to close off the supply of air to said pressure chamber.

6. In a pneumatic lockout circuit, the combination of a control valve, a condition-responsive device for normally controlling said control valve, a pneumatic relay having a valve interposed between said condition-responsive device and said control valve and normally open, means for supplying air to a pressure chamber of said pneumatic relay to keep said valve of said relay normally open, means for bleeding the air from said pressure chamber upon a limit of pressure being reached at the outlet side of said control valve, said last means comprising a pressure control having a bleeder valve normally closed, said bleeder valve being opened at said limit of pressure, and means for cutting off the supply of air to said bleeder valve and to the pressure chamber of said pneumatic relay as a result of reduction of pressure caused by opening of said bleeder valve, said last means being manually resetable.

7. In a pneumatic lockout circuit, the combination of a control valve, a condition-responsive device for normally controlling said control valve, a pneumatic relay having a valve interposed between said condition-responsive device and said control valve, said relay valve being normally open, means for supplying air to a pressure connection of said pneumatic relay to effect such opening of said relay valve, means for bleeding the air from said pressure connection of said relay upon a limit of pressure being reached by the outlet side of said control valve, said last means comprising a pressure control having a bleeder valve normally closed and opened at said limit of pressure, and means for cutting off the supply of air to said bleeder valve and the pressure connection of said pneumatic relay as a result of reduction of pressure due to opening of said bleeder valve.

8. In a pneumatic lockout circuit, the combination of a control valve, a condition-responsive device for normally controlling said control valve, a pneumatic relay having a valve interposed between said condition-responsive device and said control valve, said relay valve being normally open, means for supplying air to a pressure connection of said pneumatic relay to effect such opening of said relay valve, means for bleeding the air from said pressure connection of said relay upon a limit of pressure being reached by the outlet side of said control valve, said last means comprising a pressure control having a bleeder valve normally closed and opened at said limit of pressure, and means for cutting off the supply of air to said bleeder valve and to the pressure connection of said pneumatic relay as a result of opening of said bleeder valve, said last means being manually resetable to permit a rebuild-up of pressure to said pressure connection.

9. In a pneumatic circuit of the character disclosed, the combination of a control valve of the graduate acting pneumatically operated type, a graduating thermostat for supplying air thereto, a pneumatic relay interposed in the line of supply from said thermostat to said control valve, said pneumatic relay having a pressure chamber normally charged with air, a second pneumatic relay having a pressure chamber normally charged with air and a valve normally open due to said charge of air, said valve providing communication between a source of pneumatic pressure and said pressure chambers, and a bleeder line for said pressure chambers including pressure responsive means responding to the pressure of a medium supplied by said control valve and operable to bleed air from said chambers when one limit of such pressure is reached.

10. A pneumatic circuit of the character disclosed, comprising the combination of a control valve of the graduate acting pneumatically operated type, a graduating thermostat for supplying air thereto, a pneumatic relay interposed in the line of supply from said thermostat to said control valve, said pneumatic relay having a pressure chamber normally charged with air, a second pneumatic relay having a pressure chamber normally charged with air and a valve normally open due to said charge of air, said valve providing restricted communication between a source of pneumatic pressure and said pressure chambers, and a bleeder line for said pressure chambers including pressure responsive means responding to an excessively high pressure of a medium supplied by said control valve and operable to bleed air from said chambers when the high limit of such pressure is reached.

11. A pneumatic circuit of the character disclosed, comprising the combination of a control valve of the graduate acting pneumatically operated type, a graduating thermostat for supplying air thereto, a pneumatic relay interposed in the line of supply from said thermostat to said control valve, said pneumatic relay having a pressure chamber normally charged with air, a second pneumatic relay having a pressure chamber normally charged with air and a valve normally open due to said charge of air, said valve providing restricted communication between a source of pneumatic pressure and said pressure chambers, and a bleeder line for said pressure chambers including pressure responsive means responding to an excessively low pressure of a medium supplied by said control valve and operable to bleed air from said chambers when the low limit of such pressure is reached.

12. In a pneumatic circuit of the character disclosed, the combination of a control valve of the graduate acting pneumatically operated type, a graduating thermostat for supplying air thereto, a pneumatic relay interposed in the line of supply from said thermostat to said control valve, said pneumatic relay having a pressure chamber normally charged with air, a second pneumatic relay having a pressure chamber normally charged with air and a valve normally open due to said charge of air, said valve providing restricted communication between a source of pneumatic pressure and said pressure chambers, and a pair of pressure controls for throttling action with respect to said pressure chambers, one of said controls being operable at a high limit of pressure and the other at a low limit of pressure to bleed air from said pressure chambers.

13. A pneumatic circuit of the character disclosed comprising the combination of a control valve of the graduate acting pneumatically operated type, a graduating thermostat for supplying air thereto, a pneumatic relay interposed in the line of supply from said thermostat to said control valve, said pneumatic relay having a pressure chamber normally charged with air, a second pneumatic relay having a pressure chamber normally charged with air and a valve normally open due to said charge of air, said valve providing communication between a source of pneumatic pressure and said pressure chambers, a pair of pressure controls for throttling action with respect to said pressure chambers, one of said controls being operable at a high limit of pressure and the other at a low limit of pressure to bleed air from said pressure chambers, and a constriction between said second pneumatic relay and said bleeder line.

14. In a pneumatic control circuit having a graduate acting control valve and a graduating condition-responsive device responding to a condition controlled by a medium flowing through said control valve, a pneumatic relay interposed between said condition-responsive device and said control valve and having a bleeder line normally charged with air for keeping communication between the two established, a bleeder valve having condition responsive means responding to a condition on the outlet side of said control valve and operable upon a predetermined limit of such pressure being reached to bleed the line, and means operable by a reduction in the bleeder line to close off further supply of air to said bleeder line.

15. In a pneumatic control circuit having a graduate acting control valve and a graduating condition-responsive device responding to a condition controlled by a medium flowing through said control valves, a pneumatic relay interposed between said condition-responsive device and said control valve and having a bleeder line normally charged with air, a bleeder valve having pressure responsive means responding to pressure on the outlet side of said control valve and operable upon a predetermined limit of such pressure being reached to bleed the line, and means operable by a reduction in the bleeder line pressure to close off further supply of air to said bleeder line, said last means being resettable after a shutdown operation.

16. A pneumatic circuit of the character disclosed comprising, a control valve of the graduate acting pneumatically operated type, a graduating thermostat for supplying air thereto, a pneumatic relay interposed in the line of supply from said thermostat to said control valve, said pneumatic relay having a pressure chamber normally charged with air, a second pneumatic relay having a pressure chamber normally charged with air and a valve normally open due to said charge of air, said valve providing communication between a source of pneumatic pressure and said pressure chambers, a bleeder line for said pressure chambers including pressure responsive means responding to high pressure of a medium supplied by said control valve and operable to bleed air from said chambers when a high limit of pressure on the outlet side of said control valve is reached, and a constriction between said second pneumatic relay and said bleeder line.

17. A pneumatic circuit of the character disclosed comprising, a control valve of the graduate acting pneumatically operated type, a graduating thermostat for supplying air thereto, a pneumatic relay interposed in the line of supply from said thermostat to said control valve, said pneumatic relay having a pressure chamber normally charged with air, a second pneumatic relay having a pressure chamber normally charged with air and a valve normally open due to said charge of air, said valve providing communication between a source of pneumatic pressure and said pressure chambers, a bleeder line for said pressure chambers including pressure responsive mean responding to low pressure of a medium supplied by said control valve and operable to bleed air from said chambers when a low limit of pressure on the outlet side of said control valve is reached, a resetting valve between said bleeder line and said pressure responsive means, and a constriction between said second pneumatic relay and said bleeder line.

18. A control circuit for a condition controlling device operable by fluid pressure to an effective position and biased toward an ineffective position, a controller responsive to a condition varied by said controlling device connected by a fluid conduit to said device and to a source of fluid under pressure for controlling the fluid pressure imposed on said device, a two-position relay having valve means connected in said conduit and operable in one of its positions to bleed the fluid pressure in said conduit to a low enough value for said controlling device to be driven to its ineffective position by its bias and operable in its other position to prevent said bleed, said relay including a fluid motor for operating said valve means to said one position when a predetermined pressure exists in said motor and to its other position when a predetermined different pressure exists in said motor, a second relay having a fluid motor and a valve connected by a lever, said lever being biased to close said valve and being operable manually or by a predetermined pressure in the fluid motor of said second relay to open said valve, conduit means controlled by the valve of said second relay connected to a source of fluid under pressure and to the fluid motors of said relays, a fluid restriction in said conduit, and a bleed type control connected to said conduit means and operable to bleed fluid from said motors faster than it can be replaced through said restriction.

FREDERICK D. JOESTING.

REFERENCES CITED

The following references are of record in the file of this patent:

UNITED STATES PATENTS

| Number | Name | Date |
| --- | --- | --- |
| 1,455,633 | Lundgaard | May 15, 1923 |
| 2,019,724 | Otto | Nov. 5, 1935 |
| 2,051,431 | Wood | Aug. 18, 1936 |
| 2,270,722 | Beam | Jan. 10, 1942 |
| 2,305,933 | Soderberg | Dec. 22, 1942 |